(12) United States Patent
Lin

(10) Patent No.: US 8,206,664 B2
(45) Date of Patent: Jun. 26, 2012

(54) METHODS OF PRODUCING MULTI-LAYERED MICROFLUIDIC DEVICES

(75) Inventor: Pinyen Lin, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 76 days.

(21) Appl. No.: 12/830,489

(22) Filed: Jul. 6, 2010

(65) Prior Publication Data

US 2012/0009665 A1 Jan. 12, 2012

(51) Int. Cl.
 *B01L 3/00* (2006.01)
(52) U.S. Cl. .......................................... 422/502; 216/41
(58) Field of Classification Search .................... 216/43, 216/44, 49
See application file for complete search history.

(56) References Cited

U.S. PATENT DOCUMENTS

| | | | |
|---|---|---|---|
| 2005/0167043 A1* | 8/2005 | Stoffel et al. | 156/292 |
| 2007/0145002 A1* | 6/2007 | Street | 216/2 |
| 2007/0242920 A1* | 10/2007 | Lin et al. | 385/27 |

OTHER PUBLICATIONS

W. Wang et al.,"Printing Mems: From a Single Flexible Polyimide Film to Three-Dimensional Integrated Microfluidics," Department of Biomedical Engineering, University of California, Davis, IEEE Hilton Head Sensor and Actuator Workshop, 2008.
Govind V. Kaigala et al., Rapid Prototyping of Microfluidic Devices with a Wax Printer, *The Royal Society of Chemistry*, 2007, vol. 7, pp. 384-387.
Paolo Dario et al., "Micro-systems in Biomedical Applications," *J. Micromech. Microeng*, 2000, vol. 10, pp. 235-244.
Ali Khademhosseini et al., "Interplay of Biomaterials and Microscale Technologies for Advancing Biomedical Applications," *J. Biomater Sci. Polymer Edn*, 2006, vol. 17, No. 11, pp. 1221-1240.

* cited by examiner

*Primary Examiner* — Natalia Levkovich
(74) *Attorney, Agent, or Firm* — Oliff & Berridge, PLC

(57) ABSTRACT

Microfluidic devices are prepared by providing a substrate material having a solid adhesive thin sheet, printing solid ink on the substrate using a conventional printer, selectively etching the substrate using a wax masking layer to obtain a desired pattern, removing the masking layer from the substrate, aligning and bonding together the pattern of the substrate to a pattern of a second substrate to form a layer of substrates, and curing the layer of substrates to result in a three-dimensional microfluidic device.

15 Claims, 3 Drawing Sheets

METHODS OF PRODUCING MULTI-LAYERED MICROFLUIDIC DEVICES

The present disclosure is generally directed to thin film materials, particularly, thin film materials that can be used in preparing microfluidic devices obtained by pattern processing using wax and various printing methods.

REFERENCES

W. Wang, H. Cong, Z. Qiu, S. Zhao, H. Zhu, A. Revzin, & T. Pan, "Printing MEMS: From a Single Flexible Polyimide Film to 3D Integrated Microfluidics", 2008 IEEE Hilton Head Sensor and Actuator Workshop.

G. V. Kaigala, S. Ho, R. Penterman and C. J. Backhouse, "Rapid Prototyping of Microfluidic Devices with a Wax Printer", Lab Chip, 2007, 7, 384-387.

P. Dario, M. Carrozza, A. Benevenuto, and A. Meniciassi, "Micro-systems in Biomedical Applications", J. Micromech. Microeng., vol. 10, 2000, pp. 235-244.

A. Khademhosseini, C. Bettinger, J. Karp, J. Yeh, Y. Ling, J. Borenstein, J. Fukuda, and R. Langer, "Interplay of Biomaterials and Micro-scale Technologies for Advancing Biomedical Applications", J. Biomater: Sci. Polymer Edn, vol. 17, No. 11, pp. 1221-1240 (2000).

The disclosures of each of the foregoing publications are hereby incorporated by reference in their entireties. The appropriate components and process aspects of the each of the foregoing publications may also be selected for the present compositions and processes in embodiments thereof.

BACKGROUND

Microfluidics is an area of microfabrication that focuses on the manipulation of liquids and gases in channels with cross-sectional dimensions ranging from a few nanometers to hundreds of micrometers. Microfluidics is a rapidly growing technology impacting a number of research areas including chemical sciences, biomedical research, and drug discovery. Applications include but are not limited to genomics, proteomics, pharmaceutical research, processing of nucleic acids, forensic analysis, cellular analysis, and environmental monitoring, among others.

One of the primary focuses of microfluidic technology is directed toward making increasingly complex systems of channels with greater sophistication and fluid-handling capabilities.

Some of the first microfluidic devices were fabricated using conventional techniques that originated from the microelectronics and integrated circuit industry. Such devices were typically made in glass, silicon or quartz.

Processes that were originally designed for microelectronics, such as standard photolithographic methods, were then applied to glass or silicon substrates in order to build two-dimensional channel networks for sample transport, separation, mixing and detection systems on a monolithic chip.

To illustrate an example of an earlier process for microfluidic device fabrication based on silicon and glass substrates, a mask is prepared having both transparent and opaque regions that are patterned as a negative image of the desired channel design. A UV-light source transfers a design from the mask to a photoresist (analogous to photographic film) that was previously deposited on the substrate using traditional spin-coating methods. The photoresist is then developed in a solvent that selectively removes either the exposed or the unexposed regions. The open areas are then chemically etched into the substrate, whereby the etching time, etching conditions and crystalline orientation of the substrate control the depth of the channels and the shape of the sidewalls, respectively. Finally, the photoresist is removed and the channel system is closed by thermally bonding the patterned substrate to a cover plate.

More complex, three-dimensional systems can then be built by bonding several of these patterned layers together.

Although the above described microfluidic device fabrication and layering process based on glass and silicon substrates has some benefits, it also embodies several limitations that include, but are not limited to: (1) material limitations related to the use of glass substrates; (2) material costs; (3) the many processing steps involved; (4) limitations in geometrical design due to the isotropicity of the etching process; and (5) surface chemistry limitations with respect to silicon substrates. Each of these is discussed below.

First, the bonding of glass plates together leads to an evident source of defects and low device yields. The ability to build onto structures that have large surface topographies is impractical due to the requirement that the layers be extremely flat.

A further limitation to the glass bonding technique is that the construction of metal lines and other structures into the glass layer is very difficult, which can lead to several problems with the integration of electrical and non-electrical components on more complex devices.

In addition, when considering developing a microfluidic device fabrication process for large-scale manufacturing, the cost of substrate material is a significant factor in any high volume production. The cost of an average silicon or glass substrate can be anywhere from double the cost to twenty times as much as the cost of, for example, alternate substrate materials such as polymers.

Furthermore, microfluidic device fabrication based on silicon and glass substrates involve many processing steps (e.g. cleaning, resist coating, photolithography, development, wet etching) as described in part in the paragraphs directly above. Even though these steps can be automated in some instances, each microfluidic device must complete this fabrication process serially, which as a result increases time, overall costs, as well as the risk of manufacturing and/or human error.

Microfluidic device fabrication based on silicon and glass substrates also have geometrical design constraints due to the isotropicity of the etching process. Depending on the etching mechanism used, the shape of the patterned channel is controlled by the chemistry of the etch, etching time, and the substrate used. For many applications, different channel cross sections (such as high aspect ratio square channels) may be desirable.

Finally, the surface chemistry of silicon substrates also poses a problem, especially for continuous flow systems. For example, biomolecules tend to create a bond to silicon surface groups and therefore stick to the silicon substrate surfaces. While this can be prevented by employing a surface coating, it carries with it the added time, expenses and risks that go with an additional process step.

Thus, there is a need addressed by embodiments of the present disclosure for a method of fabricating three dimensional microfluidic devices that overcomes these limitations and, in particular, eliminates the need of expensive microlithography equipment to perform the processing, is relatively inexpensive, is capable of use for applications operating at temperatures above 65° C., and includes metal lines in its construction.

SUMMARY

The present disclosure addresses these and other needs, by providing thin films capable of being used for obtaining three-dimensional microfluidic devices that are formed from substrates comprising solid adhesive sheets. The present disclosure also provides methods for processing such printed devices using a conventional printer.

Embodiments provide methods eliminating the need for expensive microlithography equipment for patterning. In embodiments, the solid adhesive can be bonded and further provides heat and chemical resistance for the microfluidic devices. In embodiments, the process turn-around-time is significantly reduced compared to conventional methods, requiring minutes to hours to create microfluidic devices, as opposed to days to generate masks with conventional procedures.

More particularly, in embodiments, there is provided a method for building such devices, the method comprising:

providing a first substrate and a second substrate;

applying a conductive thin film on the first and the second substrate;

printing a masking layer comprised of wax ink on the first substrate and the second substrate with a conventional printer;

selectively etching the first substrate and the second substrate to faun a desired pattern on the first substrate and the second substrate;

removing the masking layer from the first substrate and the second substrate;

aligning and bonding together the pattern of the first substrate to the pattern of the second substrate to form a layer of substrates; and curing the layer of substrates to result in the microfluidic device.

EMBODIMENTS

Figure 1A:
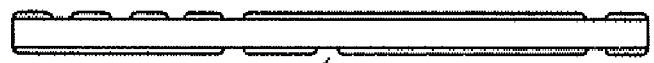
FIG. 1 illustrates a Lab-on-a-Print process for producing a three-dimensional microfluidic channel using a conventional method.
Figure 1B:
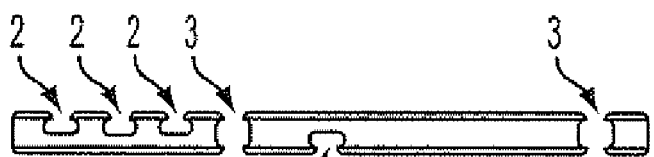
Figure 1C:
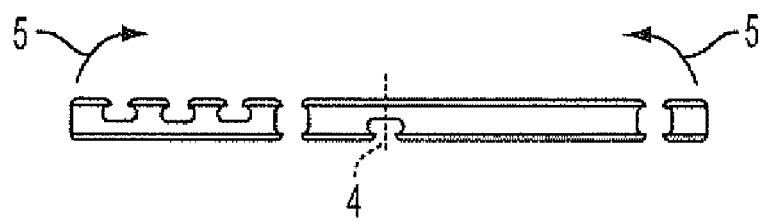
Figure 1D:
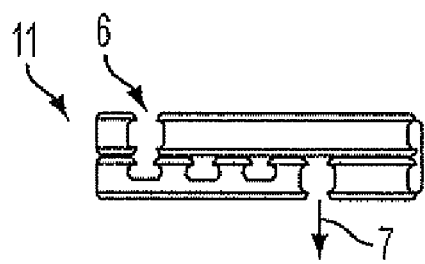

This disclosure is not limited to particular embodiments described herein, and some components and processes may be varied by one of skill, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise. All ranges disclosed herein include, unless specifically indicated, all endpoints and intermediate values.

Micro-Total Analysis and Microfluidic Devices

Recently, the concept of complete lab-on-a-chip devices or micro-total analysis systems (μ-TAS), where transport and processes (including mixing, reaction, separation, and manipulation of chemicals and particles) are being applied on smaller scales rather than traditional engineering technologies has widespread application in a number of areas. This general concept of shrinking chemical and biological analyses and reactions is at the heart of microfluidic technology.

Industrial benefits as a result of applications involving microfluidic devices include reduced size(s), improved performance, reduced power consumption, ease of disposability, and lower overall cost.

For example, one application that greatly benefits from microfluidic devices is combinatorial chemical synthesis as related to pharmaceutical research and development. With the introduction of automated high-throughput screening, it is valuable to be able to synthesize hundreds of even thousands of potential drug candidates for a single combinatorial library. The cost of synthesizing these compounds is greatly reduced when less material is needed for the reaction, and when by-products and waste generated is minimized by using microscale reactors.

Recent trends have made use of high-precision consumer electronics to simplify the fabrication process by, for example, eliminating the need for the conventional photomask.

For instance, traditional printers, such as laser printers, have been explored as a cost-effective tool for rapidly reproducing microscopic patterns. Laser printers are primarily employed to produce transparent photomasks in place of conventional chromium-based photomasks. This approach achieves resolutions in the 100 μm range, while significantly reducing costs and saving time for rapid-prototyping applications.

However, none of the conventional printing-based approaches fully resolve microfabrication issues for complex three-dimensional miniaturized structures, such as alignment and packaging, and therefore do not provide the same integrated processability as conventional micromachining techniques.

For example, FIG. 1 illustrates a Lab-on-a-Print process for three-dimensional microfluidics.

As shown in FIG. 1, desired lithographic patterns produced by a traditional solid ink printer are first printed onto a polyimide film as illustrated in step (a). A folding mark 1 is designated In step (b), using the wax patterns as a wet etching barrier, the polymer substrate is able to be selectively removed in a KOH-based solvent forming embedded microstructures such as microfluidic channels 2, through-holes 3 and a folding groove 4 corresponding to the folding mark 1. Finally, the micromachined substrate is folded over along the pre-defined alignment structures created through the etching process in the direction of folding direction 5, and then packaged into three-dimensional multilayer structures using thermal-fusion bonding of the printed wax layer, as shown in steps (c) and (d). The three-dimensional multilayer structure 11 further comprises an inlet 6 and outlet 7.

Solid Ink and Wax Printing for Microfluidic Devices

Solid-ink printing, specifically that which utilizes molten wax, is capable of producing vibrant images on a wide range of media, including flexible polymeric substrates, such as polyimide and polyethylene. For three-dimensional microfluidic fabrication, the patterned solid wax, comprising a mixture of fatty amide wax, hydrocarbon resin and dyes, can serve several important functions, namely: (1) a direct-lithography patterning layer; (2) an etching barrier that is chemically inert to most inorganic solutions; and (3) a self-adhesive layer for packaging.

Using the printed wax mask on the polyimide film, a three-dimensional Lab-on-a-Print biomolecular gradient generator with embedded microfluidic channels of 50 μm resolution can be reliably constructed, as an example.

Although polyimide and wax can be used for building three-dimensional microfluidic devices, there still remain several disadvantages to using this approach.

First, the wax can be softened, and as a result, loses its adhesion at temperatures of 65° C. or higher. Although this is adequate for applications using aqueous solutions to be carried out at room temperature, there exist many applications that are required to be conducted at much higher temperatures. For example, polymerase chain reactions (PCR), a process used to duplicate DNA, requires an operating temperature of at least 90° C.

Second, wax ink has a color, which unfortunately can have a tendency to block the ability to view or observe any fluidic movement in the device. A colorless wax ink can be employed, however, such a decision requires the use of an additional printhead and therefore results in increased manufacturing costs.

In addition, the adhesive property of wax is not as strong or effective as other adhesives, such as epoxy resins. Therefore, devices relying solely on wax adhesion can be easily separated.

Finally, wax is not chemically resistant to many organic solvents, such as alcohol or toluene, and thus, brings with it severe limitations in its applicability to various chemical, biological and pharmaceutical applications. When wax comes into contact with such organic solvents, wax dissolves or softens undesirably as a result.

There exists other inkjet printing techniques that can be used to print conductive paths. However, the ink used for these techniques contain suspended nano-particles such as silver, copper and gold. After the ink is dried, the nano-particles are sintered at temperatures below 200° C., which is below the typical bulk melting temperature of most metals.

Disadvantages and drawbacks to this technique include but are not limited to: (1) the high cost of nano-particles of silver or gold; (2) the requirement of sintering; and (3) the limited available of a wide range of nano-particles.

Substrates and Conductive Thin Films

Embodiments of the present disclosure provide substrate materials and methods for making three-dimensional printed microfluidic devices.

In embodiments, solid adhesive sheets and plastics with conductive thin films are used as substrates to fabricate three-dimensional microfluidic devices.

Preparation of a microfluidic channel according to one embodiment is described now with reference to FIGS. 2A to 2D and FIGS. 3A to 3D.

FIGS. 2A to 2D illustrate one embodiment for preparing a three dimensional printed microfluidic device using solid adhesive sheets and a plastic substrate with a conductive thin film and adhesive layer.

In embodiments, a conductive thin film layer is applied onto the surface of a substrate. As a conductive thin film layer, illustrative examples of suitable conductive thin film layers comprise metallic films including metallic composites, metal oxides, or conductive polymers.

Suitable metals may include, for example, Al, Ag, Au, Pt, Pd, Ta, Cu, Co, Cr, Mo, Ti, W, and Ni, particularly the transition metals, for example, Ag, Au, Pt, Pd, Cu, Cr, Ni, W, and mixtures thereof.

In embodiments, illustrative examples of suitable metal composites may include Au—Ag, Ag—Cu, Ag—Ni, Au—Cu, Au—Ni, Au—Ag—Cu, and Au—Ag—Pd. The metal composites may include non-metals, such as, for example, Si, C, and Ge.

Illustrative examples of conductive metal oxides include indium-tin-oxide (ITO), Al-doped zinc oxide (AZO), Zn-doped indium oxide (IZO), and the like.

In embodiments, illustrative examples of organic conductive polymers include poly(acetylene)s, poly(pyrrole)s, poly(thiophene)s, polyanilines, polythiophenes, poly(p-phenylene sulfide), poly(p-phenylene vinylene)s (PPV), and the like.

The substrate may be composed of, for example, a plastic film or sheet. As a substrate, illustrative examples include polyimide and plastic substrates, such as, for example, polyethylene terephthalate (PET), polyethylene naphthalate (PEN), polyester, polycarbonate, polytetrafluoroethylene (PTFE), polyamides, polyimide sheets and the like may be used. The thickness of the substrate may be from amount 10 micrometers to about 10 millimeters, or from about 50 micrometers to about 2 millimeters.

Figure 2A:
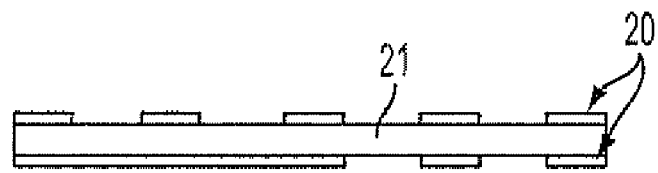
FIGS. 2A to 2D illustrate a method of producing a three-dimensional microfluidic device according to one embodiment.
Figure 2B:
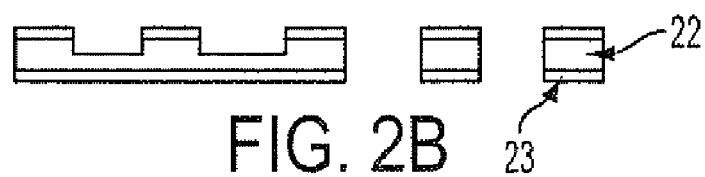

In embodiments, solid wax ink 20 is then printed onto the substrate 21 using a conventional off-the-shelf printer, as shown in FIG. 2A. The conductive film on the substrate is selectively etched using the wax as the masking layer, as shown in FIG. 2B, to obtain a substrate with solid adhesive 22. Because the wax of the masking layer and the conductive thin film are made from different materials, thus special etchants are capable of etching the substrates without reacting with the wax ink.

In embodiments, copper thin film on the substrates can be etched using an aqueous acid solution and any suitably known etching method.

In embodiments, the selectivity or etching rate ratio (A:B) between the masking layer and the substrates is very high For the etching rate ratio, A is a measure of how quickly wax disappears once it is placed into the etchant, measured in microns/minute. B is a measure of how quickly metal film disappears once it is placed into the etchant, measured in microns/minute. If the ratio of A:B is greater than approximately 50 to 100, this is an indication of high selectivity. If the ratio of A:B is between a range of 10 to 50, marginal selectivity in the case, and where the ratio is equal to 1, no selectivity is present.

Figure 2C:
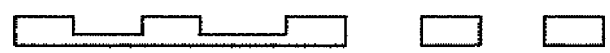

In embodiments, after the wax masking layer 23 is used to transfer patterns to the metal layer, and the substrate achieves the desired pattern, the wax masking layer 23 is removed, as shown in FIG. 2C. In FIG. 2C, although not illustrated, in embodiments an adhesive layer can be present on the substrate or the substrate alone can act as an adhesive. The wax masking layer 23 is removed by submerging the layers into a solvent. Illustrative examples of solvents include toluene and acetone.

Figure 2D:

In embodiments, the metal is then used as a mask to etch the polymeric substrates, optionally, as shown in FIG. 2D.

In embodiments, the metal is resistant to the organic solvents used to etch the plastic substrates. After etching, the substrates have the desired patterns fowled and are then ready to be bonded to another patterned substrate to form the desired three-dimensional printed microfluidic device.

In embodiments, depending on the substrate, the bonding process can be conducted at a temperature of approximately 140° C. to 165° C., for a length of time ranging from a few minutes to 2-3 hours. In embodiments, bonding can be conducted a pressure ranging from 5 to 20 psi, such as 10 to 15 psi.

In embodiments, a second patterned substrate with conductive thin films can be bonded to a first patterned substrate, such as, for example, the one illustrated in FIG. 2C, is now described with reference to FIGS. 3A to 3D.

Figure 3A:
FIGS. 3A to 3D illustrate microfluidic channels produced according to an embodiment.

FIGS. 3A to 3D illustrate a second embodiment for the preparation of a microfluidic patterned substrate 30. In FIG. 3A, solid wax ink 31 is patterned on a substrate with solid adhesives and a metal or conductive layer 32.

Figure 3B:
Figure 3C:

The substrate is then etched using wax as a masking layer 33, as shown in FIG. 3B, after which, the wax 33 is removed as shown in FIG. 3C.

Next, the substrate from FIG. 3C and the substrate from FIG. 2D are aligned and bonded together, as shown in FIG.

Figure 3D:
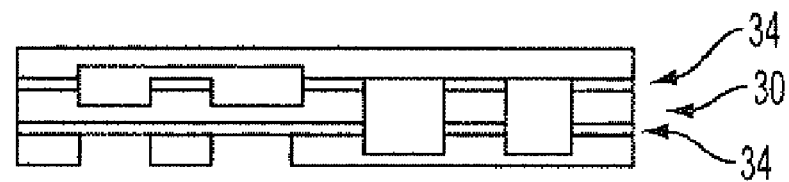

3D. In FIG. 3D, the final microfludic device 30 includes conductive thin films or metal layers 34.

The adhesive layers on the substrates formed in FIGS. 2D and 3C are then cured to form three-dimensional microfluidic channels.

In embodiments, metal can be included in the microfluidic device, and the substrates have a solid adhesive on the surface, thus the substrates can be bonded together by themselves without requiring any additional process steps, or the substrates can be bonded directly to the metal substrates. In embodiments where metal is provided, the metal can be used as a heating element for microfluidic devices.

In embodiments, the solid adhesive sheet can be made of thermosetting or thermoplastic adhesives.

Thermosetting adhesives can be cured either at room temperature or at elevated temperatures. In embodiments, suitable thermosetting adhesives can be either single or double-component systems. Once cured, thermosetting adhesives by nature form densely cross-linked structures. As a result, they display excellent chemical resistance to heat and solvents, and undergo little elastic deformation under load at elevated temperatures. Typically, thermosetting adhesive bonds are capable of withstanding temperatures of approximately 90° C. to 260° C.

Thermoplastic adhesives typically do not form cross-links during cure and can be melted without undergoing a significant change in adhesive property. Thermoplastic adhesives are single-component systems that, once melted, harden upon cooling or by evaporation of a solvent.

In embodiments, illustrative examples of suitable thermosetting solid adhesives include EPON™ 1001F, R1500 from Rogers, and Scotch-Weld™ structural adhesive film AF 191 from 3M™.

EPON™ Resin 1001F is a low molecular weight solid epoxy resin derived from a liquid epoxy resin and bisphenol-A. With different types of curing agents, EPON™ Resin 1001F can be cured throughout a temperature range of approximately 100° C. to 200° C.

R1500 from Rogers is a cross-linkable acrylic film that can be cured at 190° C. for 70 minutes at a pressure of about 100 psi.

SCOTCH-WELD™ structural adhesive film AF 191 from 3M™ is a thermosetting, modified epoxy film that can be crosslinked at 350° F. for one hour.

Additional illustrative examples of thermosetting adhesives include cyanoacrylates, polyester, urea-formaldehyde, melamine-formaldehyde, resorcinol, rescorsinol-phenol-formaldehyde, epoxy, polyimide, polybenzimidazole, acrylics and acrylic acid diester compounds.

In embodiments, one example of a suitable thermoplastic solid adhesive can be DuPont ELJ-100, a thermoplastic polyimide (TPI). This film is capable of being bonded at 250° C. for 90 minutes under a pressure of 200 psi. A further advantage of this film is that it can withstand temperatures of up to 200° C. while still maintaining its adhesive property.

Additional illustrative examples of thermoplastic solid adhesives include cellulose nitrate, cellulose acetate, polyvinyl acetate, polyvinyl chloride, polyvinyl acetals, polyvinyl alcohols, polyimides, polyamides, acrylics and phenoxy compounds.

In embodiments, thermoplastic adhesives remain chemically stable and heat resistant after curing, making them suitable for use in microfluidic devices.

In embodiments, a metal-coated substrate can be used to enhance the selectivity. In these embodiments, the wax masking layer is used to transfer patterns to the metal layer, and then the metal layer is used as a mask to etch the polymeric substrates.

In embodiments, a thin layer of metal foil can be laminated on the surface of a plastic substrate. An example of a suitable metal-coated substrate includes aluminum coated on a plastic material substrate. The thickness of the metal foil can be within the range of 15 nanometers to 100 micrometers. The thin metal-coated polymer substrates can also be obtained from roll-to-roll processes with evaporation or solution coating methods.

Illustrative examples of suitable metal foil include Al, Ag, Au, Pt, Pd, Cu, Co, Cr, Mo, Ti, W, and Ni, particularly the transition metals, for example, Ag, Au, Pt, Pd, Cu, Cr, W, Ni, and mixtures thereof. In embodiments, a metal substrate can be used. Illustrative examples of metal substrates include Al, Ag, Au, Pt, Pd, Cu, Co, Cr, In, and Ni, particularly the transition metals, for example, Ag, Au, Pt, Pd, Cu, Cr, Ni, and mixtures thereof.

The substrates suitable for this patterning technique include pure metal substrates, metal (or conductive layer)-polymer bi-layer substrates, metal-polymer-metal tri-layer substrates, thermoset adhesive-polymer bilayer substrates, thermoset adhesive-polymer-thermoset adhesive trilayer substrates, thermoplastic adhesive-polymer bilayer substrates, and thermoplastic adhesive-polymer-thermoplastic adhesive trilayer substrates.

After ink printed on the substrate, the ink pattern can be transferred to the metal only (no patterning on polymer substrate), or the solid adhesive layer only. The pattern can also be on both metal and substrate, or adhesive and substrates. The substrate patterning can be a fraction of the total thickness (i.e. trench or groove) up to the entire thickness (i.e. through hole).

This disclosure will be illustrated further in the following Examples

EXAMPLES

Example 1

Polyimide Etching

A sheet of thermoplastic polyimide (ELJ-100 from DuPont) was cleaned with isopropyl alcohol at room temperature. The sheet was cut into 8.5 inches by 11 inches. The sheet was printed with solid ink using Xerox Phaser 8400 Printer. Several line and dot patterns were printed on the polyimide sheets. The sheet was then immerged into KOH solution to isotropically etch uncovered polyimide. After the polyimide was etched away and cleaned with water and dried, the solid ink was removed with an organic solvent. The polyimide sheet was cleaned with isopropyl alcohol and water and blown dried.

The sheets were stacked up with alignment pin through the alignment holes. The stack was pressed under pressure of 100 psi and 250 degree C. for 30 minutes. The temperature was reduced to room temperature after 2 hours with pressure still on. After the stack was cooled to room temperature, the pressure was released.

Example 2

Copper Etching

Copper-laminated on polyimide thin film (25 microns on Cu) was cleaned with isopropyl alcohol and then dried. The sheet was printed with solid ink using Xerox Phaser 8400 Printer. Several line and dot patterns were printed on the Cu surface. The sheet was emerged into Cu etchant (CE-100 copper etchant, from Transene Company, INC.). The etching rate is dependent on the temperature of the etchant. After entire Cu is etched through, the sheet was cleaned with de-ionized water. The solid ink was then removed with toluene. The laminated Cu—PI sheet was cleaned with isopropyl alcohol and water and blown dried.

The present disclosure may be embodied in other specific forms without departing from its spirit or essential characteristics. The described embodiments are to be considered in all respects only as illustrated and not restrictive. The scope of this disclosure is, therefore, indicated by the appended claims rather than by the foregoing description. All changes which come within the meaning and range of equivalency of the claims are to be embraced within their scope.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A process for preparing a microfluidic device using a conventional printer, the process comprising:
    providing a first substrate and a second substrate;
    applying a conductive thin film on the second substrate;
    applying a solid adhesive thin film sheet to the first substrate and to the conductive thin film on the second substrate, respectively;
    printing a wax ink masking layer on the solid adhesive thin film sheet of the first substrate and on the solid adhesive thin film sheet of the second substrate, respectively, using the conventional printer;
    selectively etching the solid adhesive thin film sheet on the first substrate to form a desired pattern, and selectively etching the solid adhesive thin film sheet and the conductive thin film on the second substrate to form a desired pattern, respectively, wherein etchants that etch the conductive thin film and the solid adhesive thin film sheets without reacting with the wax ink are used to etch the solid adhesive thin film sheets and the conductive thin film;
    removing the wax ink masking layer from the first substrate and the second substrate, respectively;
    aligning and bonding together the pattern on the solid adhesive thin film sheet of the first substrate to the pattern on the solid adhesive thin film sheet of the second substrate; and
    curing the solid adhesive thin film sheets of the bonded first substrate and second substrate to result in the microfluidic device.

2. The process of claim 1, wherein the first substrate and the second substrate each comprise a plastic substrate or multilayer substrate.

3. The process of claim 1, wherein the second substrate comprises a metal substrate or a metal-coated substrate.

4. The process of claim 1, wherein the first substrate is a polymer substrate and the second substrate is a metal substrate.

5. The process of claim 1, wherein the desired pattern is selectively etched throughout the entire thickness of the first substrate and the entire thickness of the second substrate.

6. The process of claim 2, wherein the plastic substrate is selected from the group consisting of polyethylene terephthalate (PET), polyethylene naphthalate (PEN), polyester, polycarbonate, polytetrafluoroethylene, polyamides and polyimide sheets.

7. The process of claim 1, wherein the solid adhesive thin film sheet comprises a thermosetting adhesive.

8. The process of claim 1, wherein the solid adhesive thin film sheet comprises a thermoplastic adhesive.

9. The process of claim 7, wherein the thermosetting adhesive is selected from the group consisting of cyanoacrylates, esters, urea-formaldehyde, melamine-formaldehyde, resorcinol, rescorsinol-phenol-formaldehyde, epoxy, imides, polybenzimidazole, acrylics and acrylic acid diester compounds.

10. The process of claim 8, wherein the thermoplastic adhesive is selected from the group consisting of cellulose nitrate, cellulose acetate, polyvinyl acetate, polyvinyl chloride, polyvinyl acetals, polyvinyl alcohols, polyimides, polyamides, acrylics and phenoxy compounds.

11. The process of claim 1, wherein the conductive thin film is selected from the group consisting of metallic layers, metal composite layers, metal oxide layers and conductive polymers.

12. The process of claim 11, wherein the conductive thin film is a doped metal oxide layer selected from the group of conductive metal oxides consisting of indium-tin-oxide, Al-doped zinc oxide, Zn-doped indium oxide, and mixtures thereof.

13. The process of claim 11, wherein the conductive thin film is a metallic layer selected from the group consisting of Al, Ag, Au, Pt, Pd, Cu, Co, Cr, Mo, Ti, W, and Ni.

14. The process of claim 11, wherein the conductive thin film is a metal composite layer selected from the group consisting of Au—Ag, Ag—Cu, Ag—Ni, Au—Cu, Au—Ni, Au—Ag—Cu, and Au—Ag—Pd.

15. The process of claim 14, wherein the metal composite layer further comprises at least one non-metal.

* * * * *